Nov. 2, 1926.
W. D. BAYLEY
SILO
Filed Sept. 11, 1925   2 Sheets-Sheet 1
1,605,498
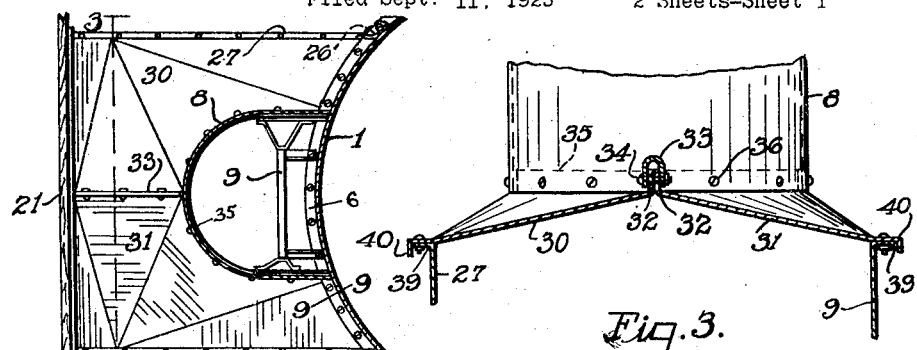
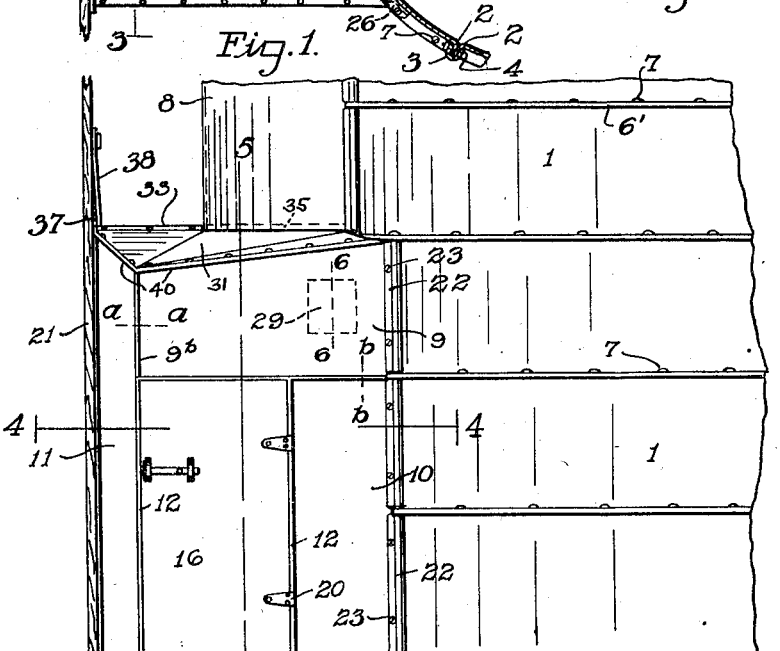
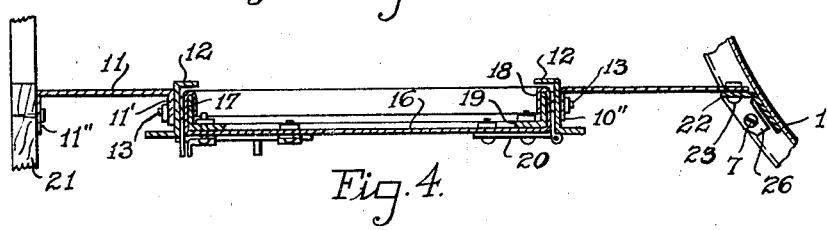
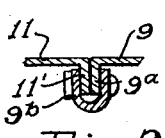
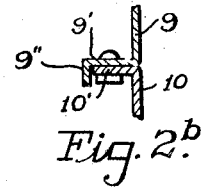
William D. Bayley INVENTOR
BY Staley Bonner ATTORNEYS

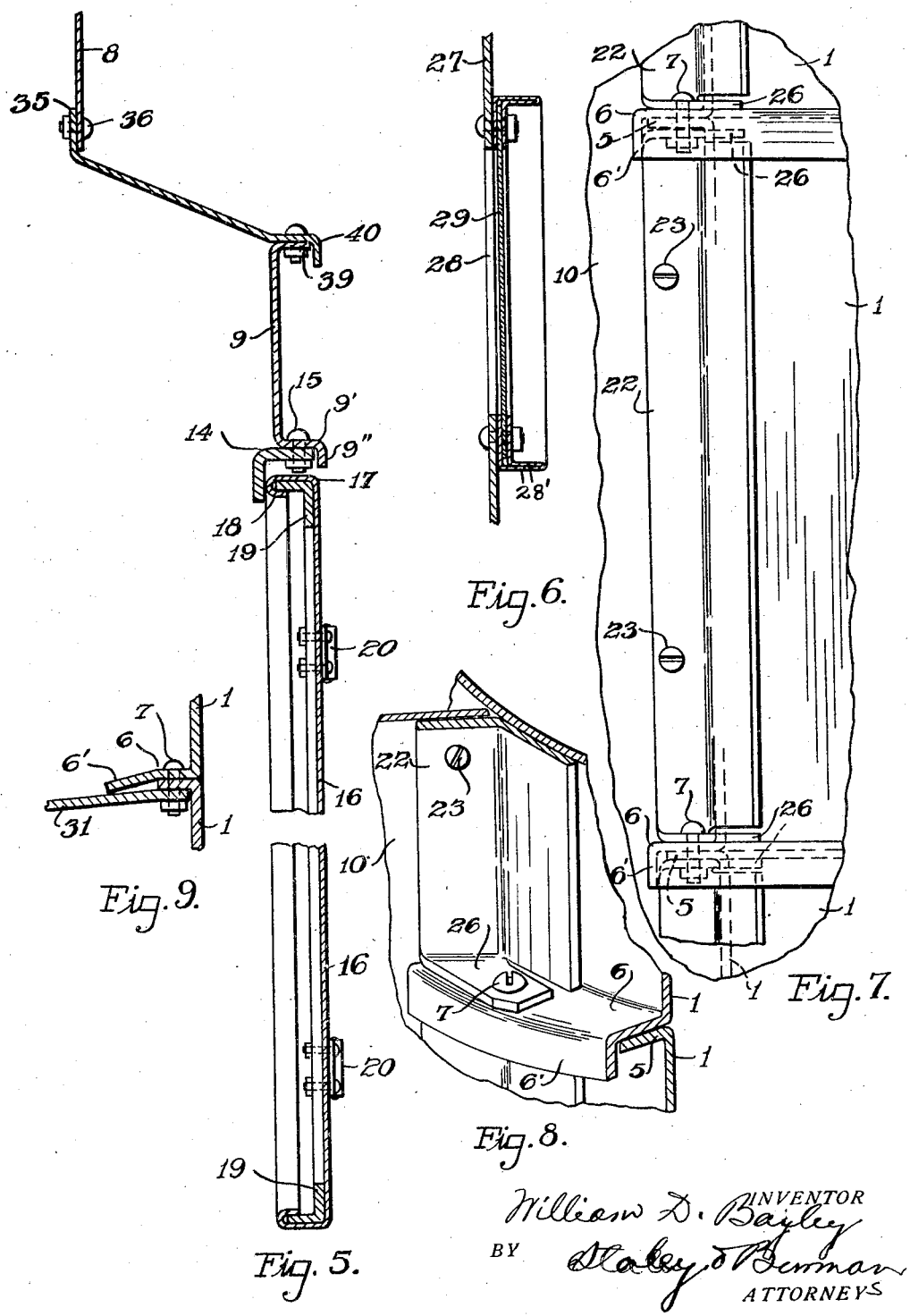

Patented Nov. 2, 1926.

1,605,498

UNITED STATES PATENT OFFICE.

WILLIAM D. BAYLEY, OF SPRINGFIELD, OHIO.

SILO.

Application filed September 11, 1925. Serial No. 55,835.

This invention relates to a housing structure for enclosing the space between a silo and a barn to provide a feed room, it particularly relating to a structure of this kind which is peculiarly applicable for use in connection with metal silos.

The object of the invention is to provide a housing of the character referred to which may be readily attached at one end to the silo and at the other end to the barn.

A further object of the invention is to provide a structure of this character which will be simple in its construction, economical in manufacture and effective for the purpose for which it is designed.

In the accompanying drawings:

Fig. 1 is a top plan view of a structure embodying the improvements showing part of the walls of the silo and barn in transverse section.

Fig. 2 is a side elevation of the same.

Fig. 2ª is an enlarged section on the line a—a of Fig. 2.

Fig. 2ᵇ is an enlarged section on the line b—b of Fig. 2.

Fig. 3 is an enlarged sectional view on the line 3—3 of Fig. 1.

Fig. 4 is an enlarged sectional view taken on the line 4—4 of Fig. 2.

Fig. 5 is an enlarged sectional view taken on the line 5—5 of Fig. 2.

Fig. 6 is an enlarged sectional view taken on the line 6—6 of Fig. 2; this section being one taken through the window which is in the wall opposite to that shown in Fig. 2.

Fig. 7 is an enlarged side elevation showing the manner of joining the walls of the housing to the silo.

Fig. 8 is a perspective view of a portion of the parts shown in Fig. 7.

Fig. 9 is an enlarged section on the line 9—9 of Fig. 1.

Referring to the drawings, 1 represents the rings which form the walls of the metal silo, these rings being formed of sections of sheet metal joined together by providing their adjacent vertical edges with outturned flanges 2 embraced by a U-shaped strip 3 and clamped by bolts 4 (Figs. 1 and 2). The rings thus formed are secured together at the top and bottom edges by providing the adjacent horizontal edges with outturned flanges 5 and 6 secured together by bolts 7; the flanges 6 having preferably downturned aprons 6' to protect the joints against the weather. A sheet metal chute is indicated at 8 and a ladder at 9, the chute and ladder being secured to the silo in the manner fully described in my pending application Ser. No. 34,002, filed June 1, 1925. A silo as thus described is one of well known form.

The housing structure is formed with two side walls and a roof. The side wall shown in Fig. 2 is constructed of three sections 9, 10 and 11 having their adjacent edges joined together in a similar manner to the silo rings; that is, the adjacent horizontal edges of 9 and 10 are provided with out-turned flanges 9' and 10' bolted together as shown in Fig. 2ᵇ, the flange 9' preferably having a down-turned weather extension 9'', and the horizontal adjacent edges of 9 and 11 have outturned flanges 9ª and 11' embraced by a U-shaped strip 9ᵇ, all bolted together as shown in Fig. 2ª. The sections 10 and 11 are spaced apart to form in connection with the lower edge of the section 9 a doorway. The inner edge of the section 10 is bent outwardly as indicated at 10'' (Fig. 4) and to the flange thus formed and also to the flange 11' of the section 11 are secured Z-shaped strips 12 by bolts 13, and to the outturned flange 9' of the section 9, is secured an angle-shaped strip 14 by bolts 15 (Fig. 5) to stiffen the edges of the sections. The door is formed of a section of sheet metal 16, the side, bottom and top edges of which are bent inwardly as indicated at 17 and then forwardly as indicated at 18, to embrace angle bars 19 to stiffen the door structure (Figs. 2 and 5). Strap hinges 20 one member of each of which is secured to the door section 19 and the other member to the Z-shaped strips 12, serve to support the door.

The side members 11 have their outer edges outwardly bent to form flanges 11'' which are nailed or otherwise secured to the barn wall. The outer edges of the silo members 9 and 10 are secured to the silo rings 1 through the instrumentality of metallic strips, one strip for each ring. Each of these strips is of angular form and the side members 9 and 10 are secured to the wings 22 of the strips by the bolts 23. To connect the strips with the silo wall each strip is provided with a top and bottom horizontally disposed foot 26. The lower foot lies on top of the flange 6 and is secured by one of the bolts 7 which secure the flanges 5 and 6 together. The upper foot of each angular strip is fitted against the under side of the flange 5 and is also secured by one of the bolts 7.

The opposite side 27 of the housing is constructed of any suitable number of sections of sheet metal joined together in the manner described in connection with the sections 9, 10 and 11, and, as shown in Fig. 6, has an opening 28 closed by a window 29 of celoglass, or other suitable material, secured in a frame formed of angle members 28' bolted to the side wall 27.

The roof is formed in two sections 30 and 31, the adjacent edges of which have upturned flanges 32 embraced by U-shaped strip 33 and secured together by the bolts 34 (Fig. 3). The roof sections are cut away to form an opening which is aligned with the opening through the chute 8 and the edges about this opening are upturned to form a flange 35 which is received in the lower end of the chute 8 and secured to the chute by bolt 36. The edges of the roof sections adjacent the barn wall 21 are bent upwardly to form flanges 37 which are nailed or otherwise secured to the barn wall and a weather strip 38 is also secured to the barn wall with its lower edge overlapping the flanges 37. The side edges of the roof sections are secured to outturned flanges 39 arranged along the upper edges of the respective side sections 9, 11 and 27 and are provided with down-turned aprons 40 as a protection against the weather. The inner edge of each roof section is cut on a curve to conform to the contour of the silo wall and this edge is secured to the flanges 5 and 6 by the bolts 7 (Fig. 9), the apron 6' being preferably bent outwardly at this point as shown. It will be noticed that each roof section is so formed as to incline downwardly and outwardly away from the walls of the barn and silo and from the chute, the upper edges of the side walls being formed on an incline to accommodate the peculiar form of the roof sections, this shape of the roof providing for ample drainage.

Having thus described my invention, I claim:

1. In a structure of the character described, the combination, with a sheet metal silo and a sheet metal chute upon the exterior thereof, of a housing having side walls and a roof, means for securing the edges of the side walls to the silo, said roof having an opening in alignment with the chute, and a flange formed about the walls of the opening and telescoped with the chute, with the chute on the outside of the flange to provide a water-tight joint.

2. In a structure of the character described, the combination, with a sheet metal silo formed of rings having adjacent edges provided with exterior flanges secured together, and a sheet metal chute on the exterior of said silo, of a sheet metal housing consisting of side walls and roof, means for securing the edges of the side walls to the silo, said roof being formed with an opening in alignment with said chute, a flange formed on the walls of said opening telescoping said chute, and means for securing the edges of the roof adjacent the silo to the silo flanges.

3. In a structure of the character described, the combination, with a sheet metal silo and a barn wall in spaced apart relation, of a sheet metal housing enclosing the space between the silo and barn wall and consisting of side walls and a roof, means for securing the edges of the side wall and roof respectively to the silo and barn wall, said roof being inclined downwardly and outwardly in opposite directions from both the silo and barn wall.

4. In a structure of the character described, the combination, with a sheet metal silo, a sheet metal chute supported by said silo and a barn wall in spaced apart relation to said silo and chute, of a sheet metal housing enclosing the space between the silo and barn wall, said housing having sides and a roof, and means for securing the edges of the sides and roof to said barn wall, chute and silo, said roof projecting downwardly and outwardly in opposite directions from said barn wall, chute and silo.

5. In a structure of the character described, the combination, with a sheet metal silo, a barn wall arranged in close proximity to but spaced apart relation therewith, and a sheet metal chute secured to said silo, of a sheet metal housing enclosing the space between the silo and barn wall including a roof, said roof being apertured, means for connecting the edges of the aperture with the lower end of said chute, one end of said roof being upturned and attached to said barn wall, and a weather strip connected with said barn wall and overlapping the upturned edge of said roof.

6. In a structure of the character described, the combination, with a sheet metal silo, a barn wall arranged in close proximity to but spaced apart relation therewith, and a sheet metal chute secured to said silo, of a sheet metal housing enclosing the space between the silo and barn wall including a roof, said roof being formed of two side sections, the inner adjacent edges of said sections being upturned, a metal U-shaped strip embracing said upturned edges and secured thereto, said roof being inclined downwardly and outwardly from said U-shaped strip and also from the said chute and barn wall, said roof being apertured, with the walls of the aperture secured to said chute, and means for securing one end of said roof to the barn wall.

In testimony whereof, I have hereunto set my hand this 27th day of August, 1925.

WILLIAM D. BAYLEY.